United States Patent
Buslepp et al.

(10) Patent No.: US 8,265,853 B2
(45) Date of Patent: Sep. 11, 2012

(54) CYLINDER PRESSURE MEASUREMENT SYSTEM AND METHOD

(75) Inventors: Kenneth J. Buslepp, Brighton, MI (US); Daniel G. Brennan, Brighton, MI (US)

(73) Assignee: GM Global Technology Operations LLC

( * ) Notice: Subject to any disclaimer, the term of this patent is extended or adjusted under 35 U.S.C. 154(b) by 537 days.

(21) Appl. No.: 12/576,530

(22) Filed: Oct. 9, 2009

(65) Prior Publication Data

US 2011/0087419 A1   Apr. 14, 2011

(51) Int. Cl.
*G06F 19/00* (2011.01)
*F02D 43/00* (2006.01)

(52) U.S. Cl. ............ 701/102; 701/114; 123/435
(58) Field of Classification Search .......... 701/102, 701/101, 110, 111, 114, 115; 123/435, 406.34, 123/406.47

See application file for complete search history.

(56) References Cited

U.S. PATENT DOCUMENTS

| | | | |
|---|---|---|---|
| 5,623,412 A * | 4/1997 | Masson et al. | 701/101 |
| 5,718,203 A * | 2/1998 | Shimada et al. | 123/305 |
| 6,502,549 B1 * | 1/2003 | Hoshino et al. | 123/406.41 |
| 7,610,139 B2 * | 10/2009 | Mizuno et al. | 701/102 |
| 7,930,093 B2 * | 4/2011 | Bauer et al. | 701/114 |
| 2011/0053733 A1 * | 3/2011 | Swales et al. | 477/3 |

* cited by examiner

*Primary Examiner* — Heu T Vo

(57) ABSTRACT

An engine control system includes a piston movement modeling module, a cylinder volume determination module, and a cylinder pressure estimation module. The piston movement modeling module models movement of a piston within a corresponding cylinder based on angular change of an engine crankshaft. The cylinder volume determination module determines a volume of the cylinder based on an angular position of the engine crankshaft and the modeled movement of the piston. The cylinder pressure estimation module estimates pressure in the cylinder based on the determined volume, an intake manifold absolute pressure (MAP), an intake valve timing, an exhaust valve timing, and an exhaust back pressure (EBP).

20 Claims, 7 Drawing Sheets

CYLINDER PRESSURE MEASUREMENT SYSTEM AND METHOD

FIELD

The present disclosure relates to engine systems and more particularly to a system and method for measuring cylinder pressure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An operating cycle of an internal combustion engine may include a plurality of engine strokes. For example, an operating cycle may include four different engine strokes. In an "intake stroke," the engine may draw air into a cylinder through an intake manifold and an intake valve. The air may then be mixed with fuel to form an air-and-fuel (A/F) mixture. In a "compression stroke," the A/F mixture may be compressed by a piston within the cylinder.

In a "power stroke," the compressed A/F mixture may be combusted by a spark plug within the cylinder to drive the piston, rotatably turning a crankshaft to generate engine power. In an "exhaust stroke," exhaust gas produced by the combustion of the A/F mixture (i.e. during the power stroke) may be expelled from the cylinder through an exhaust valve and an exhaust manifold.

The operating cycle may also be divided into an "expansion cycle" and a "non-expansion engine cycle. More specifically, the non-expansion cycle may include the intake stroke and the exhaust stroke (i.e. the pumping strokes) and a first portion of the compression stroke. Alternatively, the expansion cycle may include a remaining portion of the compression stroke and the combustion stroke. In other words, the non-expansion cycle may include the strokes (or portions thereof) where negative work occurs (i.e. where heat is not released by combustion).

"Virtual" (i.e. soft) cylinder pressure sensors may estimate a pressure in a cylinder based on various engine parameters. However, virtual cylinder pressure sensors may be inaccurate due to the energy losses (i.e. pumping losses) during the non-expansion engine cycle. Referring now to FIG. 1, a graph illustrating the inaccuracy of conventional virtual pressure sensors is shown. The graph includes pressure traces from an instrument quality sensor (i.e. approximately the actual pressure) and from a production quality virtual pressure sensor. As can be seen, the production quality virtual pressure sensor measurement is typically 20-40 kPa different than the instrument quality pressure sensor due to increased noise during the non-expansion engine cycle. Furthermore, at one point, the production quality virtual pressure sensor measurement is more than 80 kPa different than the instrument quality pressure measurement.

SUMMARY

An engine control system includes a piston movement modeling module, a cylinder volume determination module, and a cylinder pressure estimation module. The piston movement modeling module models movement of a piston within a corresponding cylinder based on angular change of an engine crankshaft. The cylinder volume determination module determines a volume of the cylinder based on an angular position of the engine crankshaft and the modeled movement of the piston. The cylinder pressure estimation module estimates pressure in the cylinder based on the determined volume, an intake manifold absolute pressure (MAP), an intake valve timing, an exhaust valve timing, and an exhaust back pressure (EBP).

A method includes modeling movement of a piston within a corresponding cylinder based on angular change of an engine crankshaft, determining a volume of the cylinder based on an angular position of the engine crankshaft and the modeled movement of the piston, and estimating pressure in the cylinder based on the determined volume, an intake manifold absolute pressure (MAP), an intake valve timing, an exhaust valve timing, and an exhaust back pressure (EBP).

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
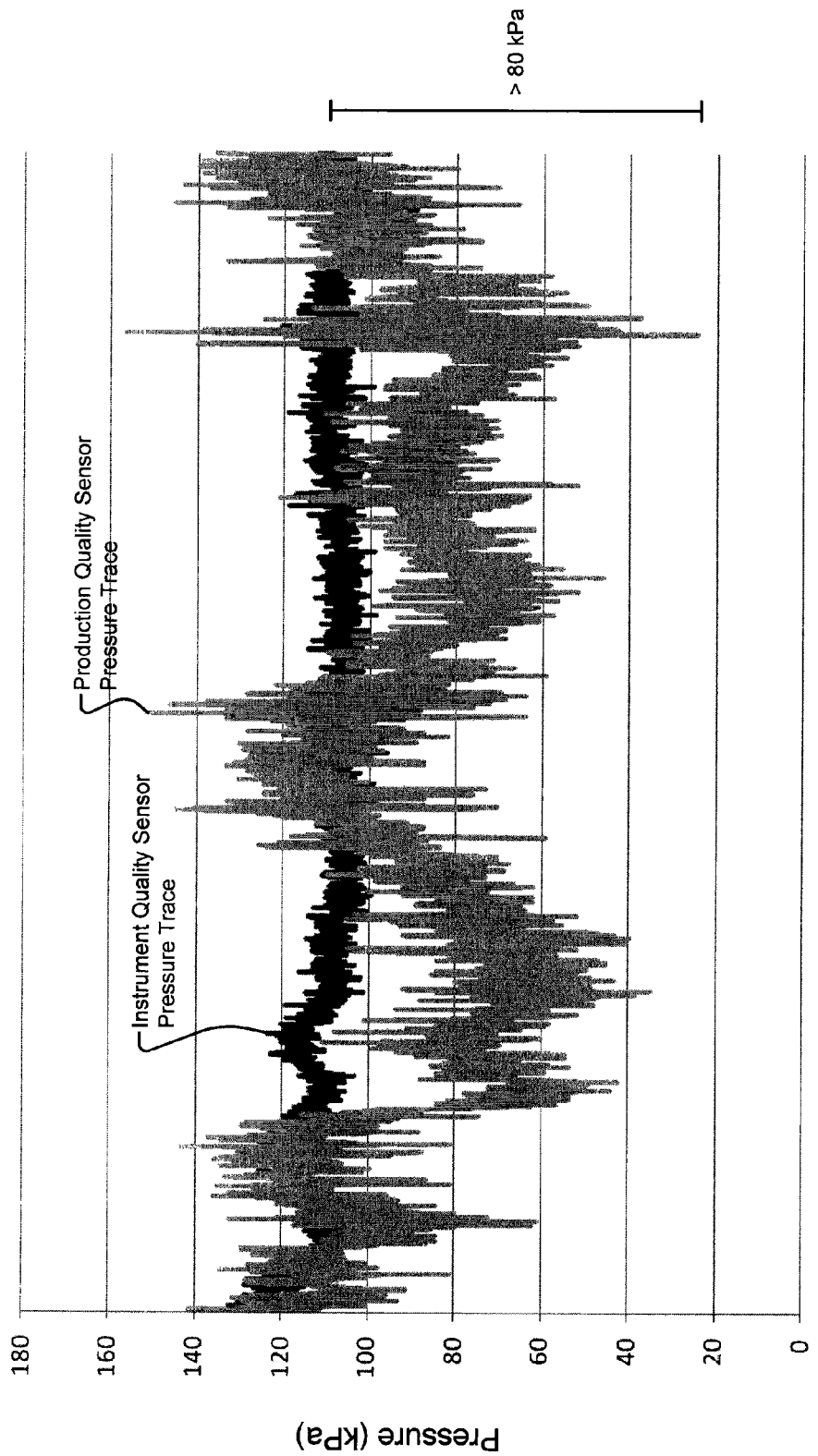
FIG. 1 is a graph illustrating inaccuracy of conventional virtual pressure sensors according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Conventional virtual cylinder pressure sensors may be inaccurate due to the energy losses (i.e. pumping losses) during the non-expansion engine cycle. More specifically, some of the engine power generated (i.e. during the power stroke) may be used for powering the intake/exhaust strokes and the first portion of the compression stroke. Thus, inaccurate measurement of cylinder pressure during the non-expansion engine cycle may result in decreased performance and/or increased emissions (i.e. due to inefficient combustion).

Therefore, a system and method for a virtual pressure sensor that compensates for the negative work during the non-expansion engine cycle is presented. For example, the negative work of the non-expansion cycles may be modeled at a particular calculation interval (e.g. every crank angle degree, or CAD). More specifically, piston movement during the rotation of an engine crankshaft may be modeled based on a trigonometric equation using the crankshaft angular change. For example, this model may be referred to as a "piston slider" equation.

The modeled linear movement of the piston may be converted into cylinder volume for any piston position. The cylinder volume may then be used in conjunction with intake/exhaust valve timing and intake/exhaust pressures to calculate a cylinder pressure during the non-expansion engine cycle. In other words, cylinder pressure may be calculated for the low pressure regions where heat is not being released by combustion (i.e. negative work). For example only, the intake pressure may be based on an intake manifold absolute pressure (MAP) and the exhaust pressure may be based on an exhaust back pressure (EBP).

The cylinder pressure may be used for pressure sensor fault diagnostics. In other words, the cylinder pressure may be used in conjunction with existing cylinder pressure sensors to rationalize changes in measured pressure and/or to filter the measured pressure in these regions (i.e. low pressure) because irrational input oscillations may occur. For example, cylinder pressure may be estimated throughout the engine operating cycle by processing a plurality of different measurements. For example only, hundreds of measurements may be processed in order to generate each cylinder pressure estimate.

Furthermore, the cylinder pressure may be used as estimations for control applications. More specifically, the cylinder pressure may be used estimated at each engine position in order to estimate pumping and compression work (i.e. energy loss). Lastly, the corrected/filtered cylinder pressure and/or the estimated energy loss may then be used to control combustion (i.e. air/fuel/spark).

Figure 2A:
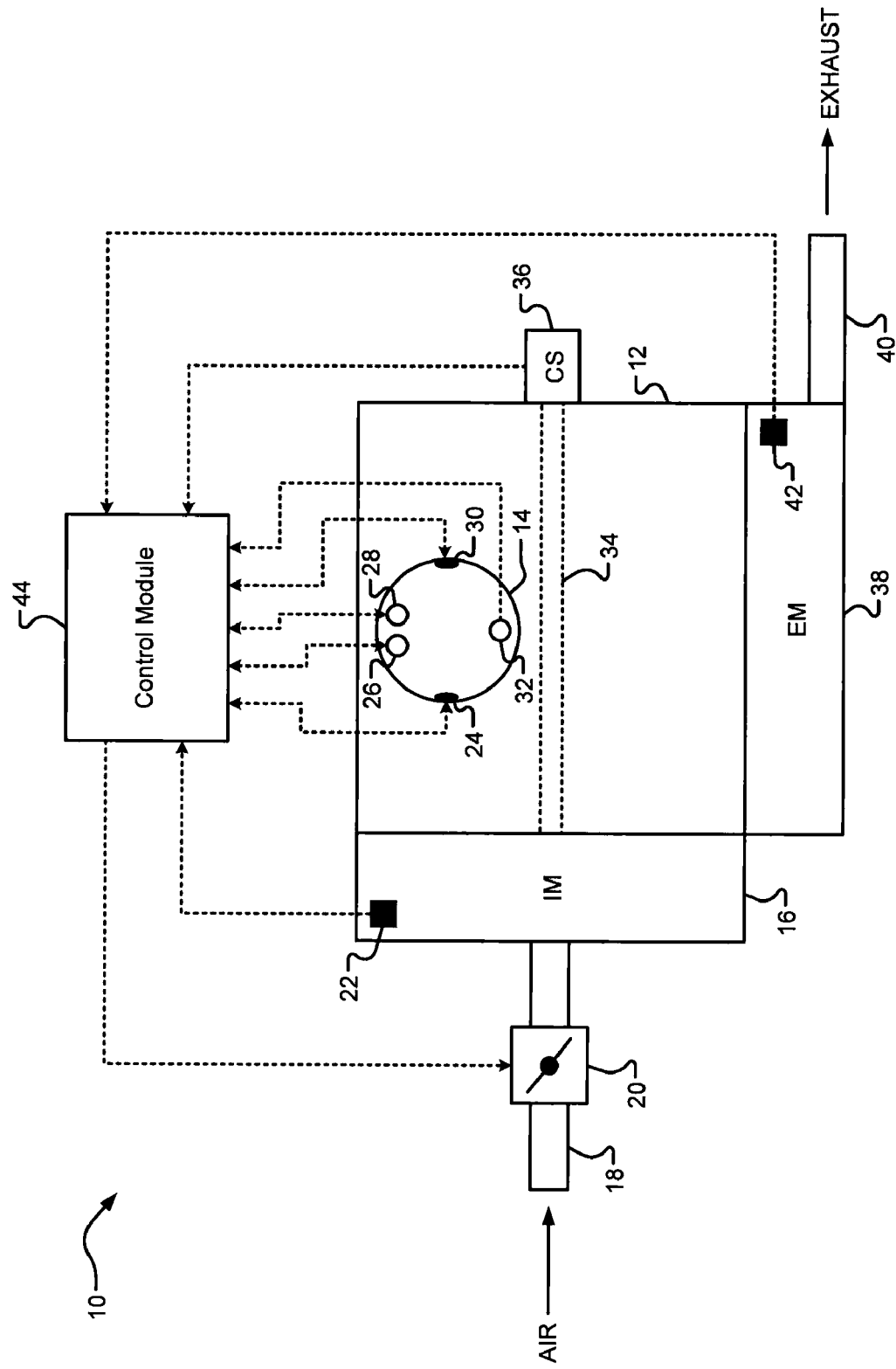
FIG. 2A is a functional block diagram of an engine system according to the present disclosure.

Referring now to FIG. 2A, an engine system 10 that includes an engine 12 is shown. The engine 12 includes an exemplary cylinder 14. It may be appreciated that while one exemplary cylinder 14 is shown, the engine 12 may include a plurality of cylinders 14. For example, 2, 3, 4, 5, 6, 8, 10, 12, and 16 cylinder implementations may also be used.

Air is drawn into the engine 12 and into an intake manifold 16 through an air intake 18 that is regulated by a throttle 20. An intake MAP sensor 22 measures pressure inside the intake manifold 16. The air drawn into the engine 12 is distributed to the cylinder 14 through an intake valve 24 and combined with fuel from a fuel tank (not shown). For example, the fuel may be injected into the cylinder 14 by a fuel injector 26. While the cylinder 14 is shown to include the fuel injector 26 (i.e. direct fuel injection), it can be appreciated that the fuel injector 26 may also be located in the intake manifold 20 or in an intake port (not shown) prior to the intake valve 24 (i.e. port fuel injection). In one embodiment, the cylinder 14 may also include a pressure sensor 32 that measures pressure inside the cylinder 14.

The air/fuel (NF) mixture in the cylinder 14 is compressed by a piston (not shown) and combusted by a spark plug 28. The combustion of the NF mixture drives a piston (not shown), which rotatably turns a crankshaft 34 to produce drive torque. A crankshaft sensor 36 may measure a rotational position and/or speed (RPM) of the crankshaft 34. Exhaust gases may be expelled from the cylinder 14 through an exhaust valve 30, an exhaust manifold 38, and an exhaust system 40. In one embodiment, an EBP sensor 42 measures pressure inside the exhaust manifold 38. Alternatively, for example, EBP may be also calculated based on flow of the exhaust gas.

A control module 44 regulates operation of the engine 12. For example, the control module 44 may control the throttle 20, the intake valve 24, the exhaust valve 30, and/or the fuel injector 26 to control the A/F ratio in the engine 12. Additionally, for example, the control module 44 may control the spark plug 28 to control the ignition timing of the engine 12. The control module 44 also receives signals from the MAP sensor 22, the crankshaft sensor 36, and the EBP sensor 42.

Figure 2B:
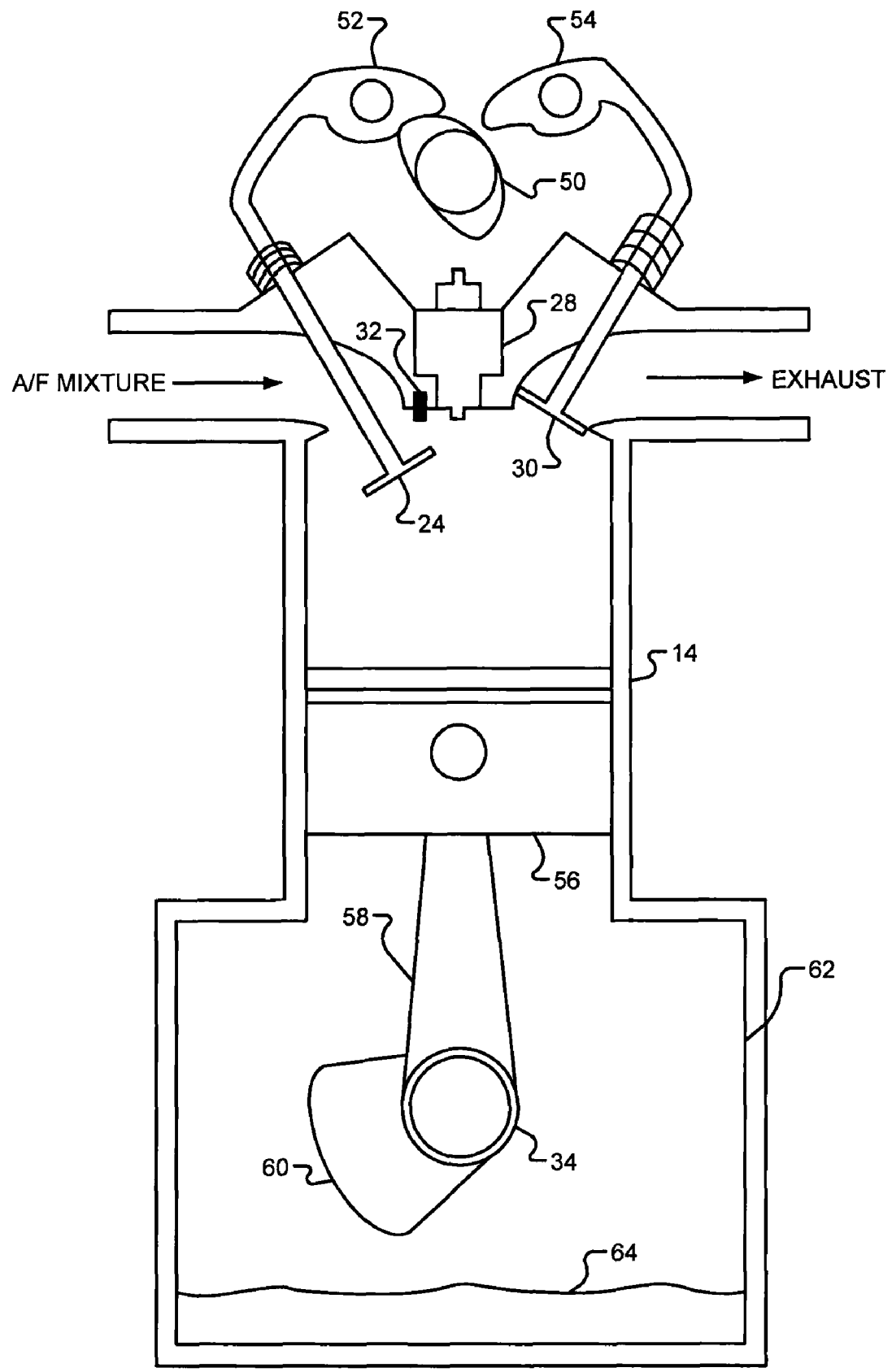
FIG. 2B is a cross-sectional diagram of a cylinder of the engine system according to the present disclosure.

Referring now to FIG. 2B, a cross-sectional view of the exemplary cylinder 14 is shown. The cylinder 14 includes the intake valve 24, the spark plug 28, the exhaust valve 30, and the cylinder pressure sensor 32. While the cylinder 14 is not shown to include the fuel injector 26 (i.e. port fuel injection), it can be appreciated that the fuel injector 26 may be in the cylinder 14 (i.e. direct fuel injection).

Above the cylinder 14 is a camshaft 50, an intake rocker arm 52, and an exhaust rocker arm 54. While a single camshaft 50 is show, it can be appreciated that multiple camshafts 50 may be implemented (e.g. dual overhead camshafts). The intake rocker arm 52 is connected to and thus controls movement of the intake valve 24. Similarly, the exhaust rocker arm 54 is connected to and thus controls the movement of the exhaust valve 30. The camshaft 50 includes irregular lobes that actuate one of the rocker arms 52, 54 to open a corresponding valve 24, 30, respectively. Furthermore, when one of the rocker arms 52, 54 and the corresponding valve 24, 30 is actuated, a spring on the other one of the rocker arms 52, 54 closes the corresponding valve 24, 30. In other words, for example, only one of the valves 24, 30 may be open at a particular time. As shown in FIG. 2B, for example, the camshaft 50 is actuating the intake rocker arm 52 and the intake valve 24 while the exhaust valve 30 remains closed.

The cylinder 14 further includes a piston 56. The piston 56 is attached to the crankshaft 34 via a connecting rod 58. The crankshaft 34 is also attached a counterweight 60. The crankshaft 34, the counterweight 60, and a portion of the connecting rod 58 reside in a crankcase 62. The crankcase 62 may further include a lubricant sump 64 (e.g. oil) that is used for lubricating moving parts. A volume of the cylinder 14 may refer to a space above the piston 56 (i.e. when both the intake/exhaust valves 24, 30 are closed).

Figure 3:
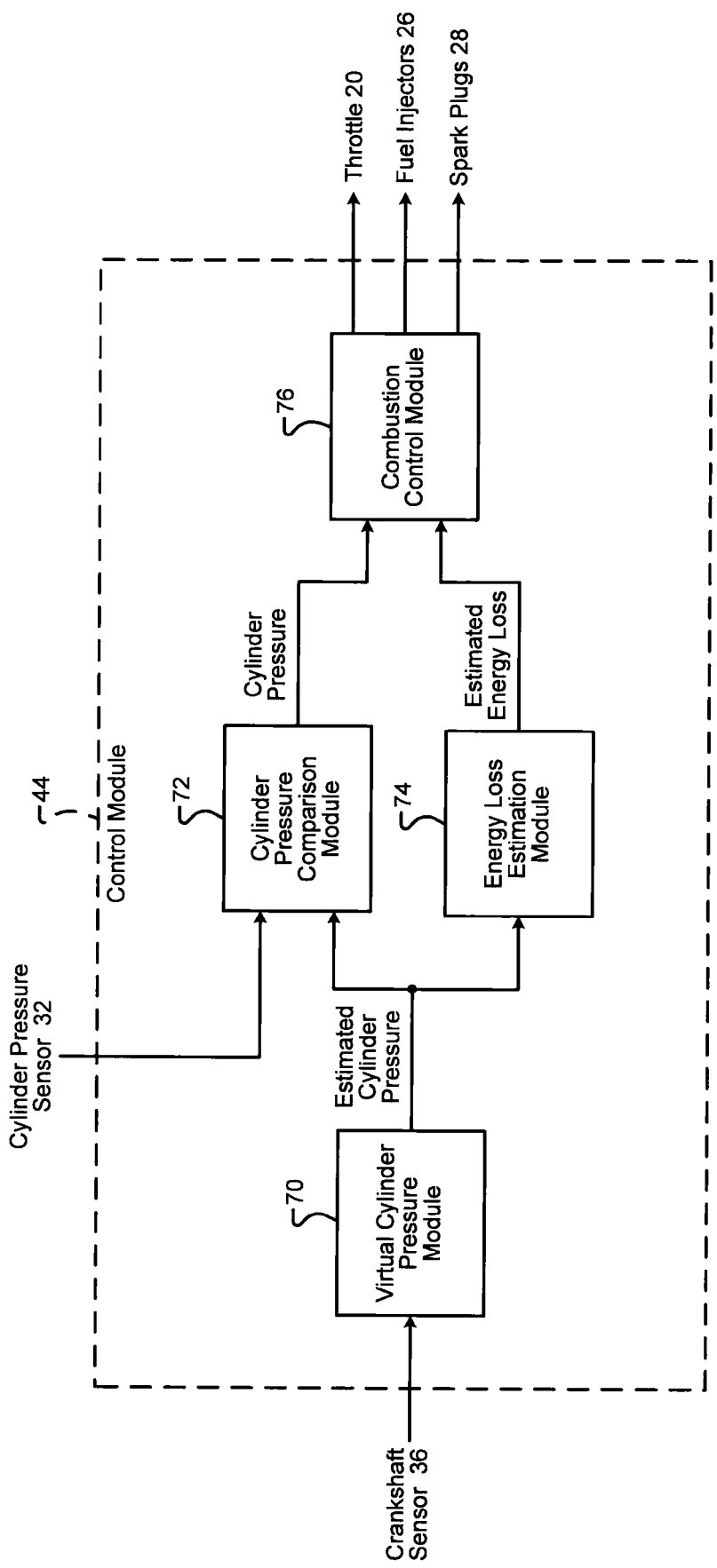
FIG. 3 is a functional block diagram of a control module according to the present disclosure.

Referring now to FIG. 3, the control module 44 is shown in more detail. The control module 44 may include a virtual cylinder pressure module 70, a cylinder pressure comparison module 72, an energy loss estimation module 74, and a combustion control module 76.

The virtual cylinder pressure module 70 receives a signal from the crankshaft sensor 36. The virtual cylinder pressure module 70 estimates a pressure in one of the cylinders 14 based on the position of the crankshaft 34 (from the crankshaft sensor 36) and a high-resolution (e.g., every crank angle degree) model of the non-expansion engine cycle (explained in more detail later).

The cylinder pressure comparison module 72 and the energy loss estimation module 74 each receive the estimated cylinder pressure. The cylinder pressure comparison module 72 also receives a measured cylinder pressure from the cylinder pressure sensor 32. The cylinder pressure comparison module 72 compares the measured cylinder pressure to the estimated cylinder pressure.

The cylinder pressure comparison module 72 may verify the measured cylinder pressure based on the estimated cylinder pressure. For example, the cylinder pressure comparison module 72 may determine whether a difference between the measured cylinder pressure and the estimated cylinder pressure is less than a predetermined pressure difference threshold.

The cylinder pressure comparison module 72 may also filter the measured cylinder pressure using the estimated cylinder pressure. More specifically, in the estimated cylinder pressure may be used instead of the measured cylinder pressure in low pressure regions of the engine cycles due to irrational input oscillations that may occur.

The energy loss estimation module 74 may estimate an energy loss for a cylinder during a particular engine cycle. More specifically, the energy loss estimation module 74 may estimate an amount of negative work during one of the intake/exhaust strokes (i.e. the pumping strokes) or the first portion of the compression stroke. The negative work may correspond to an energy loss during the corresponding engine stroke.

The combustion control module 76 receives the cylinder pressure from the cylinder pressure comparison module 72 and the estimated energy loss from the energy loss estimation module 74. The combustion control module 76 may control combustion of the engine based on the received signals. More specifically, the combustion control module 76 may generate control signals for at least one of the throttle 20, the fuel injectors 26, and the spark plugs 28. In other words, the combustion control module 76 may effectively control the A/F ratio and ignition timing of the engine 12. For example only, the combustion control module 76 may increase airflow via the throttle 20 when the cylinder pressure during an intake stroke is below a predetermined pressure threshold.

Additionally, the combustion control module 76 may control the A/F ratio and ignition timing of the engine 12 to compensate for one or more of the cylinders 14 that include energy losses. For example only, the combustion control module 76 may increase fuel (via the fuel injectors 26) to other cylinders 14 to compensate for the one or more cylinders 14 that include energy losses. Alternatively, in one embodiment, the combustion control module 76 may also generate a warning signal (e.g. a check engine flag) when one or more of the cylinders 14 include energy losses greater than a predetermined energy loss threshold.

Figure 4A:
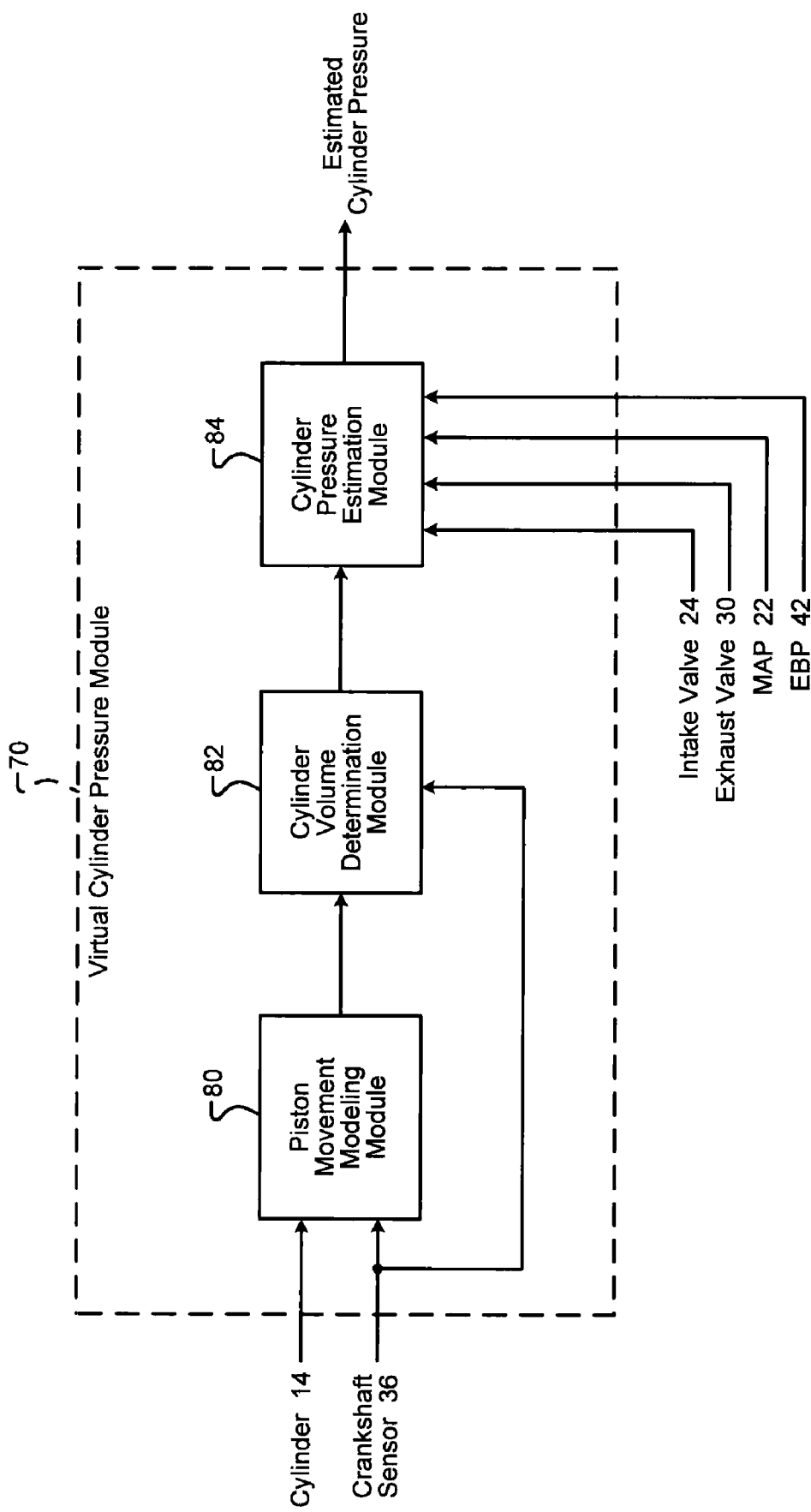
FIG. 4A is a functional block diagram of a cylinder pressure estimation module according to the present disclosure.

Referring now to FIG. 4A, the virtual cylinder pressure module 60 is shown in more detail. The virtual cylinder pressure module 60 may include a piston movement modeling module 70, a cylinder volume determination module 72, and a cylinder pressure estimation module 74.

The piston movement modeling module 70 receives a signal from the crankshaft sensor 36. The piston movement modeling module 70 models movement of the piston of a particular cylinder 14 based on the signal from the crankshaft sensor 36. More specifically, the piston movement modeling module 70 may model how fast the piston moves (i.e. up and down) based on the RPM of the engine crankshaft 34. For example, in one embodiment, the piston movement modeling module 70 may receive data from the crankshaft sensor 36 for one engine cycle, and then generate the piston movement model based on the data received during the engine cycle.

The cylinder volume determination module 72 receives the piston movement model from the piston movement modeling module 70. The cylinder volume determination module 72 may determine a cylinder volume corresponding to a current piston position using the piston movement model. More specifically, the cylinder volume determination module 72 may generate a plurality of cylinder volumes based on a predetermined sampling rate of the piston position and the piston movement model. For example only, the predetermined sampling rate may be every crank angle degree (CAD) of the crankshaft.

The cylinder pressure estimation module 74 receives the cylinder volume from the cylinder volume determination module 72. The cylinder pressure estimation module 74 also receives timing of the intake/exhaust valves 24, 30, the MAP from the MAP sensor 22, and the EBP from the EBP sensor 42. The cylinder pressure estimation module 74 estimates a pressure of the corresponding cylinder based on the received signals/measurements. More specifically, the cylinder pressure estimation module 74 may estimate the cylinder pressure based on pressure before/after the cylinder (i.e. MAP and EBP), whether or not the cylinder valves are open/closed (intake/exhaust valve 24,30 timing), and the current cylinder volume (based on the piston position).

As previously mentioned, the virtual cylinder pressure module 70 generates high-resolution estimations of cylinder pressure. In other words, the virtual cylinder pressure module 70 operates with a high sampling rate (e.g. one CAD), and thus may provide accurate estimations of cylinder pressure.

Figure 4B:
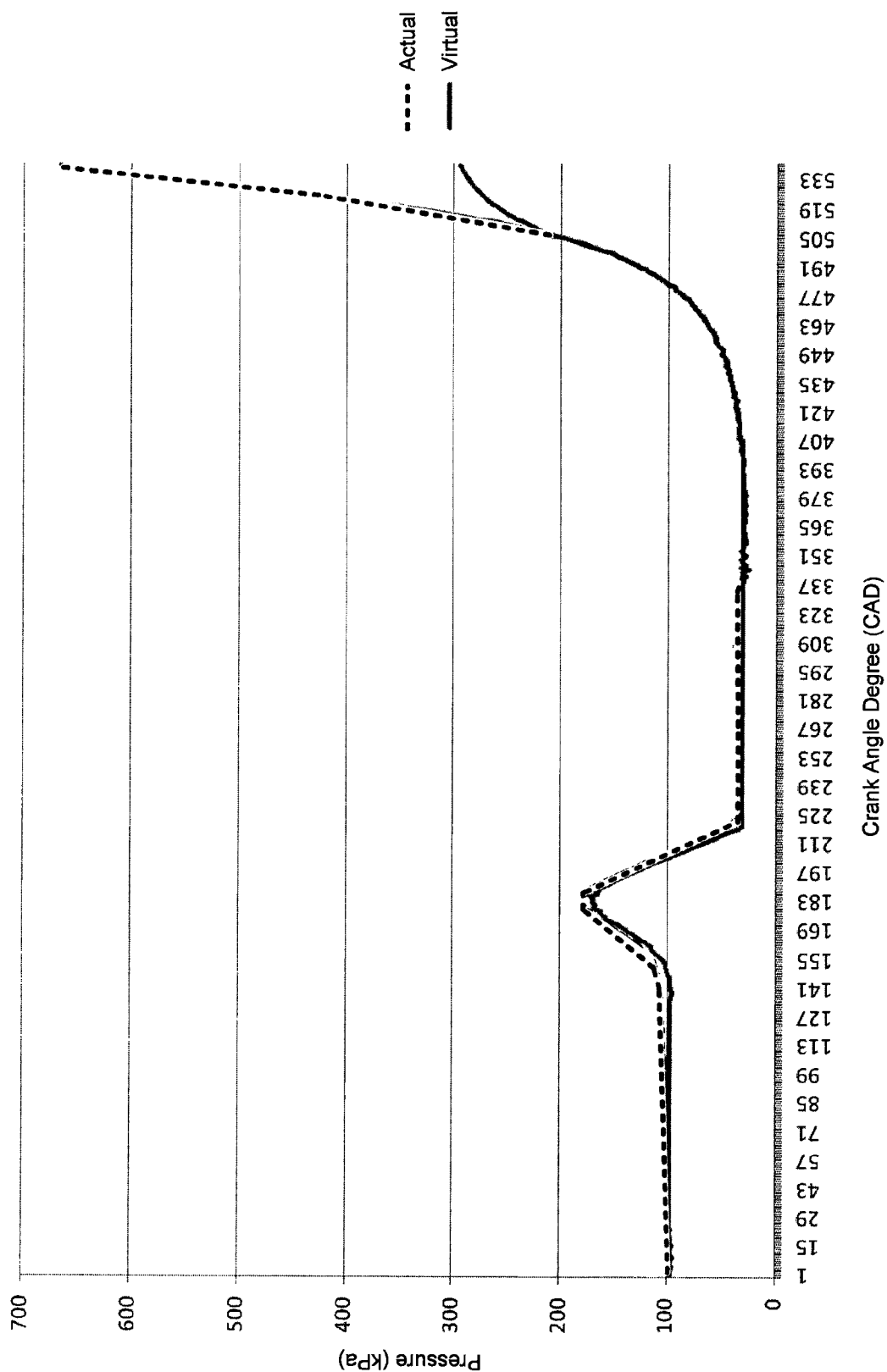
FIG. 4B is a graph illustrating output of the virtual cylinder pressure sensor according to the present disclosure versus an actual pressure trace.

Referring now to FIG. 4B, a graph illustrating accuracy of the virtual pressure sensor of the present disclosure is shown. As can be seen, the virtual pressure sensor measurement is approximately the same as the actual pressure measurement throughout the non-expansion engine cycle.

Figure 5:
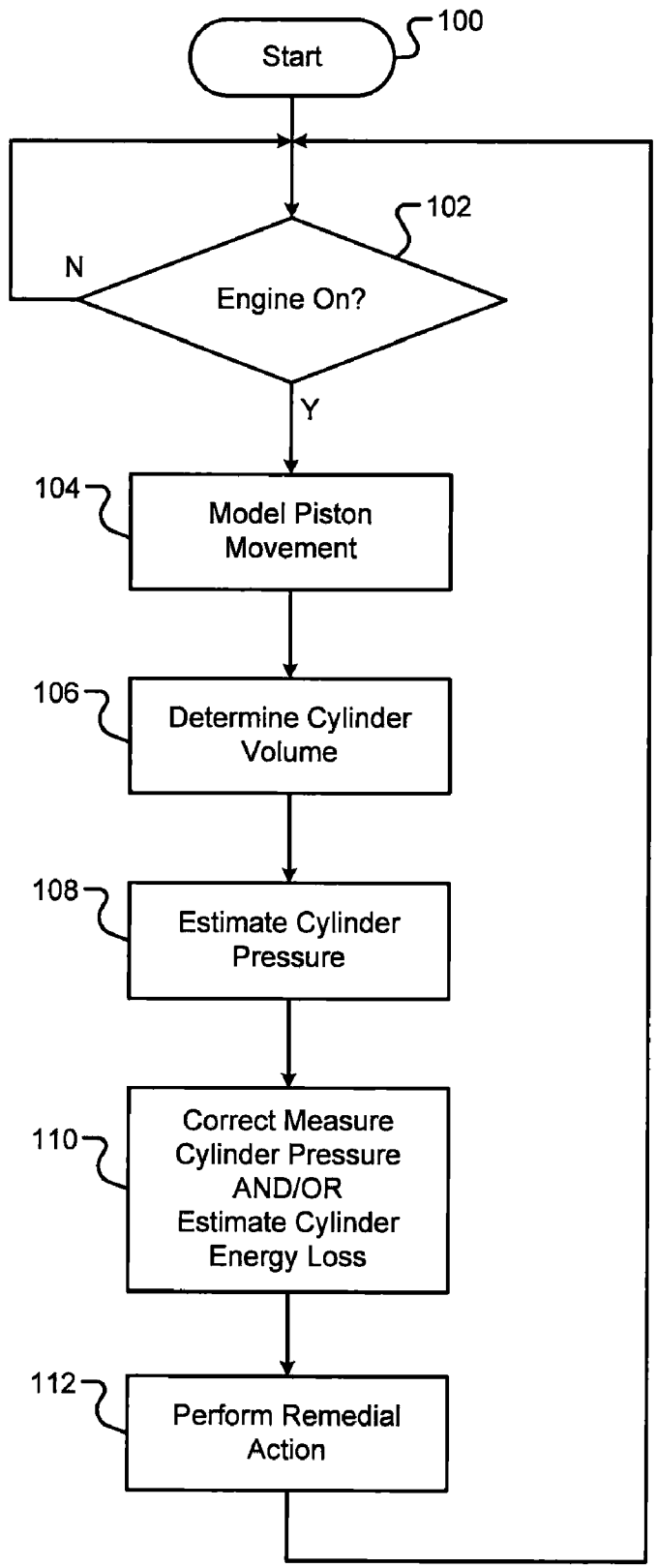
FIG. 5 is a flow diagram of a method for operating the engine system of the present disclosure.

Referring now to FIG. 5, a method of operating the engine system 10 begins in step 100. In step 102, the control module 44 determines whether the engine 12 is on. If true, control may proceed to step 104. If false, control may return to step 102.

In step 104, the control module 44 models movement of a piston in one of the cylinders 14. In step 106, the control module 44 determines a cylinder volume based on a current position of the piston and the model. In step 108, the control module 44 estimates a pressure of the cylinder 14 based on valve timing, pressure before/after the cylinder 14, and the determined cylinder volume.

In step 110, the control module 44 corrects a measured cylinder pressure from the cylinder pressure sensor 32 using the estimated cylinder pressure and/or estimates an energy loss of the cylinder 14 based on the estimated cylinder pressure.

In step 112, the control module 44 performs a remedial action based on the corrected cylinder pressure and/or the estimated energy loss of the cylinder 14. For example, the remedial action may be generating air/fuel/spark control signals and/or generating a warning signal (e.g. a check engine flag). Control may then return to step 102.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   a piston movement modeling module that models movement of a piston within a corresponding cylinder based on angular change of an engine crankshaft;
   a cylinder volume determination module that determines a volume of the cylinder based on an angular position of the engine crankshaft and the modeled movement of the piston; and
   a cylinder pressure estimation module that estimates pressure in the cylinder based on the determined volume, an intake manifold absolute pressure (MAP), an intake valve timing, an exhaust valve timing, and an exhaust back pressure (EBP).

2. The engine control system of claim 1, wherein both the volume of the cylinder is determined and the cylinder pressure is estimated a predetermined number of times during each engine cycle, wherein the predetermined number of times corresponds to a predetermined sampling period.

3. The engine control system of claim 2, wherein the predetermined period corresponds to one degree of rotation of the engine crankshaft.

4. The engine control system of claim 1, further comprising:
a cylinder pressure sensor that measures pressure in the cylinder.

5. The engine control system of claim 4, further comprising:
a cylinder pressure comparison module that generates a corrected pressure of the cylinder based on the estimated pressure and the measured pressure.

6. The engine control system of claim 5, wherein the cylinder pressure comparison module generates the corrected pressure based on the estimated pressure when a difference between the measured pressure and the estimated pressure is greater than a predetermined pressure threshold.

7. The engine control system of claim 6, wherein the cylinder pressure comparison module generates the corrected pressure based on the measured pressure when a difference between the measured pressure and the estimated pressure is less than or equal to the predetermined pressure threshold.

8. The engine control system of claim 5, further comprising:
a combustion control module that one of generates a warning signal and controls at least one of an A/F ratio and spark timing of the engine, based on the corrected cylinder pressure.

9. The engine control system of claim 1, further comprising:
a energy loss estimation module that estimates an energy loss during one of an intake stroke, an exhaust stroke, and a first portion of a compression stroke of the cylinder, based on the estimated pressure.

10. The engine control system of claim 9, further comprising:
a combustion control module that one of generates a warning signal and controls at least one of an A/F ratio and spark timing of the engine, based on the estimated energy loss.

11. A method comprising:
modeling movement of a piston within a corresponding cylinder based on angular change of an engine crankshaft;
determining a volume of the cylinder based on an angular position of the engine crankshaft and the modeled movement of the piston; and
estimating pressure in the cylinder based on the determined volume, an intake manifold absolute pressure (MAP), an intake valve timing, an exhaust valve timing, and an exhaust back pressure (EBP).

12. The method of claim 11, wherein both determining the volume of the cylinder and estimating the pressure in the cylinder are performed a predetermined number of times during each engine cycle, wherein the predetermined number of times corresponds to a predetermined sampling period.

13. The method of claim 12, wherein the predetermined period corresponds to one degree of rotation of the engine crankshaft.

14. The method of claim 11, further comprising:
measuring pressure in the cylinder using a cylinder pressure sensor.

15. The method of claim 14, further comprising:
generating a corrected pressure of the cylinder based on the estimated pressure and the measured pressure.

16. The method of claim 15, wherein generating the corrected pressure is based on the estimated pressure when a difference between the measured pressure and the estimated pressure is greater than a predetermined pressure threshold.

17. The method of claim 16, wherein generating the corrected pressure is based on the measured pressure when a difference between the measured pressure and the estimated pressure is less than or equal to the predetermined pressure threshold.

18. The method of claim 15, further comprising:
one of generating a warning signal and controlling at least one of an A/F ratio and spark timing of the engine, based on the corrected cylinder pressure.

19. The method of claim 11, further comprising:
estimating an energy loss during one of an intake stroke, an exhaust stroke, and a first portion of a compression stroke of the cylinder, based on the estimated pressure.

20. The method of claim 19, further comprising:
one of generating a warning signal and controlling at least one of an A/F ratio and spark timing of the engine, based on the estimated energy loss.

\* \* \* \* \*